United States Patent [19]

Isozumi

[11] Patent Number: 4,890,026
[45] Date of Patent: Dec. 26, 1989

[54] ELECTRIC MOTOR WITH COMMUTATOR DIRECTLY MOLDED ON MOTOR SHAFT AND METHOD OF CONSTRUCTION

[75] Inventor: Shuzoo Isozumi, Hyogo, Japan

[73] Assignee: Mitsubishi Denki Kabushiki Kaisha, Tokyo, Japan

[21] Appl. No.: 158,401

[22] Filed: Feb. 22, 1988

[30] Foreign Application Priority Data

Feb. 23, 1987 [JP] Japan .................................. 62-25751

[51] Int. Cl.⁴ ............................................ H01R 39/16
[52] U.S. Cl. ...................................... 310/233; 310/235
[58] Field of Search ............... 310/177, 233, 234, 235, 310/236, 265

[56] References Cited

U.S. PATENT DOCUMENTS 2,708,246  5/1955  Dunn .................................. 310/235
2,831,991  4/1958  Perkins ................................ 310/235
3,603,825  9/1971  Sheridan et al. ................. 310/234 X
4,519,261  5/1985  Hamano ................................. 74/7 E

FOREIGN PATENT DOCUMENTS 56-117557  9/1981  Japan .................................... 310/233

OTHER PUBLICATIONS

Japanese Utility Model Public Disclosure No. 14644/85.

Primary Examiner—William M. Shoop, Jr.
Assistant Examiner—Marc S. Hoff
Attorney, Agent, or Firm—Wolf, Greenfield & Sacks

[57] ABSTRACT

A D.C. motor comprising an armature core, an armature coil, a commutator and an armature shaft is disclosed. The armature shaft is provided with a whirl-stop portion having a length sufficient to allow the armature core and the commutator to be fixed to it. The whirl-stop portion may be formed by rolling or knurling.

12 Claims, 1 Drawing Sheet

ELECTRIC MOTOR WITH COMMUTATOR DIRECTLY MOLDED ON MOTOR SHAFT AND METHOD OF CONSTRUCTION

BACKGROUND OF THE INVENTION

1. Field of the Invention

The present invention relates to D.C. motors, and, more specifically, to an improvement in an armature shaft and a commutator of a D.C. motor.

2. Description of the Prior Art

FIG. 1 shows a main part of a conventional D.C. motor. In this figure, a plurality of narrow parallel channels are formed longitudinally around the intermediate portion 1 of a shaft 2 made of iron. The shaft 2 is pressed into the central aperture of an armature core 3 to fixedly mount the armature core 3 to the channel-formed portion 1 of the shaft 2. Adjacent the portion 1, a commutator 4 is also rigidly mounted to the shaft 2. A gear 5 is formed at one end of the shaft opposite the commutator 4 with respect to the armature core 3.

The commutator 4 comprises a hollow cylinder 4a made of an insulating material such as resin, a plurality of conductive segments 4b flush-mounted on the outer surface of the cylinder 4a at equal intervals, and an insert 4c provided on the inner surface of the hollow cylinder 4a. The cylinder 4a, segments 4b and insert 4c are integrally molded to form the commutator 4. The conductive segments 4b are connected to corresponding taps of armature coils 6 wound around the armature core 3.

As described, the commutator 4 of the conventional D.C. motor needs the insert 4c which is integrally formed inside the hollow cylinder 4a made of resin, and it is necessary to press the shaft 3 into the commutator 4. Accordingly, the conventional D.C. motor has many elements and assembly work thus involves many steps. Moreover, since the commutator 4 is fixed to the shaft 3 by way of pressing the shaft 3 into the commutator 4, it sometimes happens that the shaft 3 is pressed into the commutator 3 in such a manner that the control axis of the shaft 3 and that of the commutator 4 are offset from each other.

SUMMARY OF THE INVENTION

It is an object of the present invention to solve the above mentioned problems or defects of the conventional D.C. motor.

It is another object of the present invention to provide a D.C. motor which enables a reduction in the number of parts of a commutator and allows a commutator to be easily and rigidly mounted on an armature shaft.

In order to achieve these objects, the D.C. motor according to the present invention has an armature shaft on the outer surface of which a whirl-stop portion is formed for rigidly mounting an armature core and a commutator on the shaft. Around a section of the whirl-stop portion at which the commutator is to be mounted, a tubular member of resin is fixed by molding it integrally with this section of the whirl-stop portion. At the same time as the molding is conducted, a plurality of conductive segments providing a brush contact surface are flush-mounted on the outer surface of the tubular member.

Since the D.C. motor according to the present invention comprises the structure described above, a commutator with a reduced number of parts can be employed and the work of mounting the commutator on the shaft can be omitted. Moreover, since the commutator is mounted rigidly on the shaft, the durability of the product can be improved and the productivity raised.

The above and other objects and features of the invention will appear more fully from consideration of the following description taken in connection with the accompanying drawing wherein one example is described by way of illustration.

DESCRIPTION OF THE PREFERRED EMBODIMENT

Figure 1:
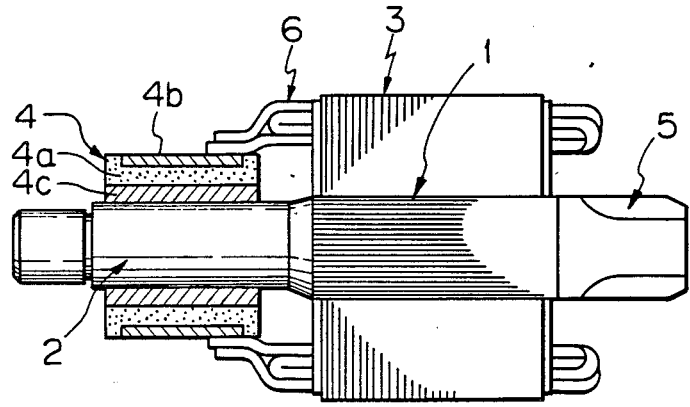
FIG. 1 illustrates a partially sectional view of a main portion of a conventional D.C. motor.
Figure 2:
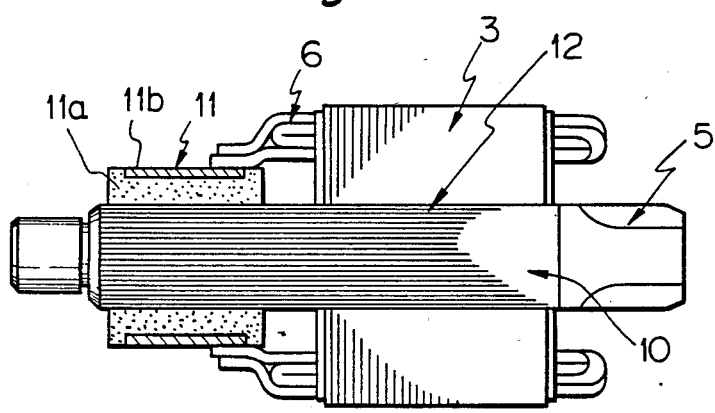
FIG. 2 illustrates an embodiment of a partially sectional view of the main portion of a D.C. motor according to the invention.

Referring now to FIG. 2, there is shown in partially sectional form an embodiment of the main portion of a D.C. motor according to the present invention. In FIG. 2, like parts and components are designated by the same reference numerals as those used in FIG. 1.

In this embodiment, the D.C. motor has an armature shaft 10 made of iron to which the armature core 3 and a commutator 11 are rigidly fixed. The commutator 11 includes a tubular member 11a made of an insulating material and a plurality of conductive segments 11b flush-mounted on the outer surface of the tubular member 11a and connected to the tap wires of the armature coils 6. More specifically, the armature shaft 10 is partially provided with a whirl-stop portion 12 by forming a large number of narrow longitudinal channels circumferentially. The whirl-stop portion 12 has an axial length sufficient to allow the armature core 3 and the commutator 11 to be rigidly mounted on the armature shaft 10.

In order to fix the commutator 11 on the armature shaft 10, an appropriate resin material is molded around one end of the whirl-portion 12 to fixedly form the tubular member 11a integrally with the armature shaft 10. At the same time as the molding is being conducted, a plurality of conductive segments 11b made of, for example, copper are provided flush-mounted on the outer surface of the tubular member 11a by casting. More specifically, centering the armature shaft 10, the conductive segments 11b are first placed at predetermined positions on the inner surface of a molding box. Then molten resin is poured into the molding box to form the tubular member 11a around the armature shaft 10 and simultaneously flush-mount the conductive segments 11b. As a result, the tubular member 11a is rigidly fixed to the armature shaft 10 because the molten resin enters the channels of the whirl-stop portion 12 and hardens integrally with the armature shaft 10.

It should be noted that the whirl-stop portion may be formed on the outer surface of the armature shaft 10 by rolling or knurling.

The invention has been described in detail with particular reference to a certain preferred embodiment thereof, but it will be understood that variations and modifications can be effected within the spirit and scope of the invention.

What is claimed is:

1. In a D.C. electric motor having an armature shaft with an axis, an armature core mounted on said shaft and a commutator having a tubular insulator mounted on said shaft, the improvement wherein said shaft has a ridged section in which ridges on said shaft extend continuously under said core, between said core and said tubular insulator and under said insulator.

2. In a D.C. electric motor, the improvement defined in claim 1 wherein said ridges comprise splines aligned parallel to said shaft axis.

3. In a D.C. electric motor, the improvement defined in claim 1 wherein said ridges comprise knurls.

4. A method of assembling a D.C. electric motor having an armature shaft, an armature core and a commutator having a tubulaar insulator with conductive segments on the periphery of said tubular insulator, said method comprising the steps of:
   A. forming a continuous ridged section on said shaft;
   B. mounting said armature core on said ridged shaft section; and
   C. molding said tubular insulator directly on said ridged shaft section adjacent to said armature core.

5. A method of assembling a D.C. electric motor according to claim 4 wherein step C comprises the steps of:
   C1. positioning a molding box around said armature shaft at the location of said tubular insulator;
   C2. placing said conductive segments inside said molding box; and
   C3. pouring molten resin into said molding box such that the molten resin flows around the ridges on said ridged section of said shaft whereby said tubular member is rigidly mounted on said armature shaft.

6. A method of assembling a D.C. electric motor according to claim 4 wherein step A comprises the step of:
   A1. rolling said shaft to produce said continuous ridged section.

7. A method of assembling a D.C. electric motor according to claim 4 wherein step A comprises the step of:
   A2. knurling said shaft to produce said continuous ridged section.

8. A D.C. electric motor having an armature shaft, an armature core and a commutator having a tubular insulator with conductive segments on the periphery of said tubular insulator, said motor assembled by a method comprising the steps of:
   A. forming a continuous ridged section on said shaft;
   B. mounting said armature core on said ridged shaft section; and
   C. molding said tubular insulator directly on said ridged shaft section adjacent to said armature core.

9. A D.C. electric motor assembled according to claim 8 wherein step C comprises the steps of:
   C1. positioning a molding box around said armature shaft at the location of said tubular insulator;
   C2. placing said conductive segments inside said molding box; and
   C3. pouring molten resin into said molding box such that the molten resin flows around the ridges on said ridged section of said shaft whereby said tubular member is rigidly mounted on said armature shaft.

10. A D.C. electric motor assembled according to claim 8 wherein step A comprises the step of:
    A1. rolling said shaft to produce said continuous ridged section.

11. A D.C. electric motor aasembled according to claim 8 wherein step A comprises the step of:
    A2. knurling said shaft to produce said continuous ridged section.

12. A D.C. electric motor comprising:
    an armature shaft with an axis and a ridged section in which ridges on said shaft extend continuously from a first end of said ridged section along said shaft to a second end of said ridged section;
    an armature core rigidly mounted on said ridged section of said shaft;
    a plurality of windings wound around said armature core;
    a commutator having a tubular insulator with a periphery, said tubular insulator being rigidly mounted on said ridged section of shaft, and having conductive segments mounted on said periphery, said conductive segments being electrically connected to said windings.

* * * * *